US 8,510,280 B2

(12) United States Patent
Xu et al.

(10) Patent No.: US 8,510,280 B2
(45) Date of Patent: Aug. 13, 2013

(54) SYSTEM, METHOD, AND COMPUTER-READABLE MEDIUM FOR DYNAMIC DETECTION AND MANAGEMENT OF DATA SKEW IN PARALLEL JOIN OPERATIONS

(75) Inventors: Yu Xu, San Diego, CA (US); Olli Pekka Kostamaa, Santa Monica, CA (US); Xin Zhou, Monterey Park, CA (US)

(73) Assignee: Teradata US, Inc., Dayton, OH (US)

( * ) Notice: Subject to any disclaimer, the term of this patent is extended or adjusted under 35 U.S.C. 154(b) by 494 days.

(21) Appl. No.: 12/494,366

(22) Filed: Jun. 30, 2009

(65) Prior Publication Data

US 2010/0332458 A1    Dec. 30, 2010

(51) Int. Cl.
*G06F 17/00* (2006.01)
(52) U.S. Cl.
USPC ............................................ 707/698; 707/714
(58) Field of Classification Search
USPC ................. 707/626, 633, 636, 635, 634, 698, 707/715
See application file for complete search history.

(56) References Cited

U.S. PATENT DOCUMENTS

| 7,054,852 | B1 * | 5/2006 | Cohen ................................. 1/1 |
| 7,941,424 | B2 * | 5/2011 | Xu et al. ....................... 707/714 |
| 2007/0156724 | A1 * | 7/2007 | Kostamaa et al. ............ 707/100 |
| 2009/0024568 | A1 * | 1/2009 | Al-Omari et al. ................ 707/2 |
| 2009/0276477 | A1 * | 11/2009 | Thuringer et al. ............ 707/205 |

* cited by examiner

*Primary Examiner* — Amy Ng
(74) *Attorney, Agent, or Firm* — Steve McDonald; Ramin Mahboubian (57) ABSTRACT

A system, method, and computer-readable medium for dynamic detection and management of data skew in parallel join operations are provided. Rows allocated to processing modules involved in a join operation are redistributed among the processing modules by a hash redistribution of the join attributes. Receipt by a processing module of an excessive number of redistributed rows having a skewed value on the join attribute is detected by a processing module which notifies other processing modules of the skewed value. Processing modules then terminate redistribution of rows having a join attribute value matching the skewed value and either store such rows locally or duplicate the rows. The processing module that has received an excessive number of redistributed rows removes rows having a skewed value of the join attribute from a redistribution spool allocated thereto and duplicates the rows to each of the processing modules. The join operation is completed by performing a local join at each processing module and merging the results of the local join operations.

26 Claims, 10 Drawing Sheets

SYSTEM, METHOD, AND COMPUTER-READABLE MEDIUM FOR DYNAMIC DETECTION AND MANAGEMENT OF DATA SKEW IN PARALLEL JOIN OPERATIONS

BACKGROUND

A database is a collection of stored data that is logically related and that is accessible by one or more users or applications. A popular type of database is the relational database management system (RDBMS), which includes relational tables, also referred to as relations, made up of rows and columns (also referred to as tuples and attributes). Each row represents an occurrence of an entity defined by a table, with an entity being a person, place, thing, or other object about which the table contains information.

One of the goals of a database management system is to optimize the performance of queries for access and manipulation of data stored in the database. Given a target environment, an optimal query plan is selected, with the optimal query plan being the one with the lowest cost (e.g., response time) as determined by an optimizer. The response time is the amount of time it takes to complete the execution of a query on a given system.

In massively parallel processing (MPP) systems, dealing with data skew in parallel joins is critical to the performance of many applications. As is understood, a join comprises a structured query language (SQL) operation that combines records from two or more tables. Partial redistribution, partial duplication (PRPD) mechanisms have been proposed for an optimizer to use when joining large tables where data skew is known to exist and the skewed data values are also known. For example, assume a join operation is to be performed with a large relation R having 10 million rows and a smaller relation S having 1 million rows featuring a join condition R.a=S.b (where a and b are columns of the relations R and S, respectively). Assume both R and S are evenly partitioned across all processing modules, e.g., Access Module Processors (AMPs), and neither join attribute R.a or S.b is the primary index, e.g., the values that are hashed to distribute the base table rows to MPP processing modules, of R or S. As referred to herein, hash redistribution comprises generating a hash value of, for example, column or index values of a table and redistributing the corresponding rows to processing modules based on the hash values. Further assume there are 100 AMPs deployed in the MPP system. Without data skew in column R.a (e.g., relation R can be roughly evenly hash partitioned on R.a), the optimizer will hash redistribute rows of R on R.a and hash redistribute rows of S on S.b to join R and S. Each AMP will join about 100,000 rows of R and 10,000 rows of S.

However, consider the case where there is data skew in column R.a. Assume there is a single data value of column R.a which appears in 1 million rows of R. The above redistribution plan will redistribute 1 million rows of R with the skewed value in R.a to a single AMP. In this instance, the AMP having 1 million rows redistributed thereto will have an excessive load with respect to other AMPs involved in the join operation. An AMP featuring an excessive load in such a situation is referred to herein as a hot AMP. In the present example, the hot AMP will have about 1,090,000 rows while all other 99 AMPs will have only about 90,000 rows of R. Consequently, the system performance is degraded and may result in an "out of spool space" error on the hot AMP which may cause queries to abort—often after hours of operation in large data warehouses. Out of spool space may occur because, although disk capacity continues to become larger and cheaper, parallel DBMSs may still maintain spool space quotas for users on each AMP for the purpose of workload management and concurrency control.

Contemporary PRPD plans handle the above described data skew problem by keeping the rows of R with the skewed value in R.a locally and duplicating the rows of S that have the skewed value in S.b. However, such a PRPD mechanism assumes the skewed values in R are known before query execution time, e.g., by statistics, sampling, or a full table scan.

SUMMARY

Disclosed embodiments provide a system, method, and computer readable medium for a dynamic approach to resolving data skew issues when executing a parallel join without foreknowledge that data skew is present. Rows allocated to processing modules involved in the join operation are initially redistributed among the processing modules by a hash redistribution on values of the join attributes. Receipt by a processing module of an excessive number of redistributed rows having a skewed value on the join attribute is detected thereby identifying the processing module as a hot processing module. The hot processing module then notifies the other processing modules involved in the parallel join operation of the skewed value, and further directs the other processing modules to terminate redistribution of rows having a join attribute value matching the skewed value. Each processing module, upon notification of the detected skewed value, invokes a partial redistribution, partial duplication subroutine. The processing modules involved in the parallel join operation then open a spool file for local storage of rows of the larger table of the join operation that have a value of the join attribute that match the detected skewed value. The processing modules additionally open another spool file for duplication of rows of the smaller table of the join operation that have a value of the join attribute that match the detected skewed value. The hot processing module removes rows having a value of the join attribute that match the detected skewed value from a redistribution spool allocated thereto for storage of rows of the smaller table received via redistribution from other processing modules. The rows removed by the hot processing module from the redistribution spool allocated thereto for storage of rows of the smaller table received via redistribution from other processing modules are then duplicated to each of the processing modules involved in the parallel join operation. When all rows of the tables involved in the parallel join operation have been redistributed or duplicated, the join operation is completed by performing a local join at each processing module and merging the results of the local join operations.

BRIEF DESCRIPTION OF THE DRAWINGS

Aspects of the present disclosure are best understood from the following detailed description when read with the accompanying figures, in which.

DETAILED DESCRIPTION

It is to be understood that the following disclosure provides many different embodiments or examples for implementing different features of various embodiments. Specific examples of components and arrangements are described below to simplify the present disclosure. These are, of course, merely examples and are not intended to be limiting.

Figure 1:
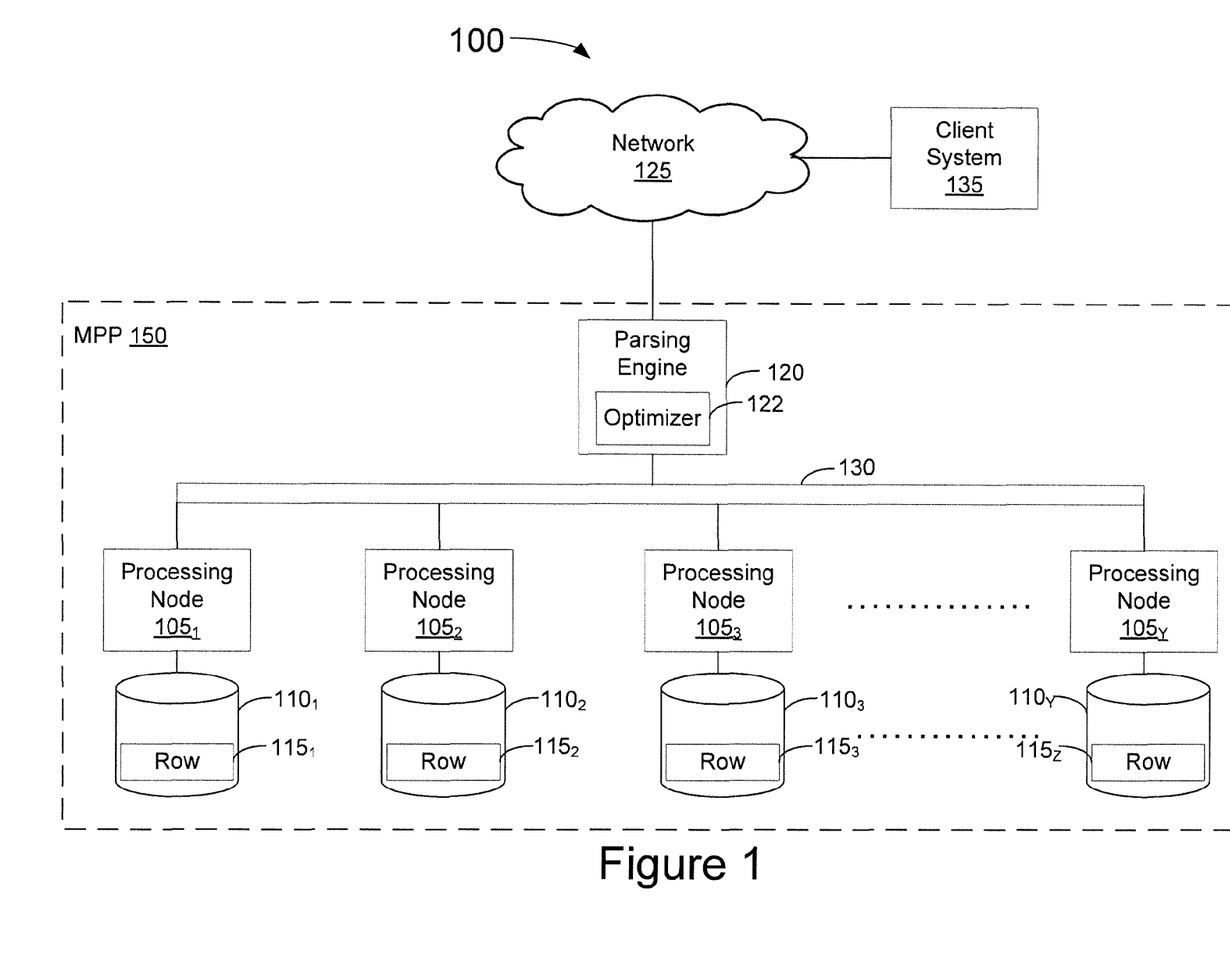
FIG. 1 depicts a diagrammatic representation of an exemplary architecture for a large database system that is suited for implementing mechanisms for dynamic detection and handling of data skew in parallel joins in accordance with disclosed embodiments.

FIG. 1 depicts a diagrammatic representation of an exemplary architecture for a large database system 100, such as a Teradata Active Data Warehousing System, that is suited for implementing mechanisms for dynamic detection and handling of data skew in parallel joins in accordance with disclosed embodiments. The database system 100 includes a relational database management system (RDBMS) built upon a massively parallel processing (MPP) system 150. Other types of database systems, such as object-relational database management systems (ORDBMS) or those built on symmetric multi-processing (SMP) platforms, are also suited for use, and the depicted and described architecture is exemplary only and is chosen to facilitate an understanding of the disclosed embodiments.

As shown, the database system 100 includes one or more processing nodes $105_{1 \ldots Y}$ that manage the storage and retrieval of data in data-storage facilities $110_{1 \ldots Y}$. Each of the processing nodes may host one or more AMPs or other processing modules. Each of the data-storage facilities $110_{1 \ldots Y}$ includes one or more disk drives or other storage medium.

The system stores data in one or more tables in the data-storage facilities $110_{1 \ldots Y}$. The rows $115_{1 \ldots Z}$ of the tables are stored across multiple data-storage facilities $110_{1 \ldots Y}$ to ensure that the system workload is distributed evenly across the processing nodes $105_{1 \ldots Y}$. A parsing engine 120 organizes the storage of data and the distribution of table rows $115_{1 \ldots Z}$ among the processing nodes $105_{1 \ldots Y}$ and accesses processing modules $105_{1 \ldots Y}$ via an interconnect 130. The parsing engine 120 also coordinates the retrieval of data from the data-storage facilities $110_{1 \ldots Y}$ in response to queries received from a user, such as one using a client computer system 135 connected to the database system 100 through a network connection 125. The parsing engine 120, on receiving an incoming database query, applies an optimizer component 122 to the query to assess the best plan for execution of the query. Selecting the optimal query-execution plan includes, among other things, identifying which of the processing nodes $105_{1 \ldots Y}$ are involved in executing the query and which database tables are involved in the query, as well as choosing which data-manipulation techniques will serve best in satisfying the conditions of the query. Database statistics are used in making these assessments during construction of the query-execution plan. For example, database statistics may be used by the optimizer to determine data demographics, such as attribute minimum and maximum values and data ranges of the database. The database system typically receives queries in a standard format, such as the Structured Query Language (SQL) put forth by the American National Standards Institute (ANSI).

Figure 2:
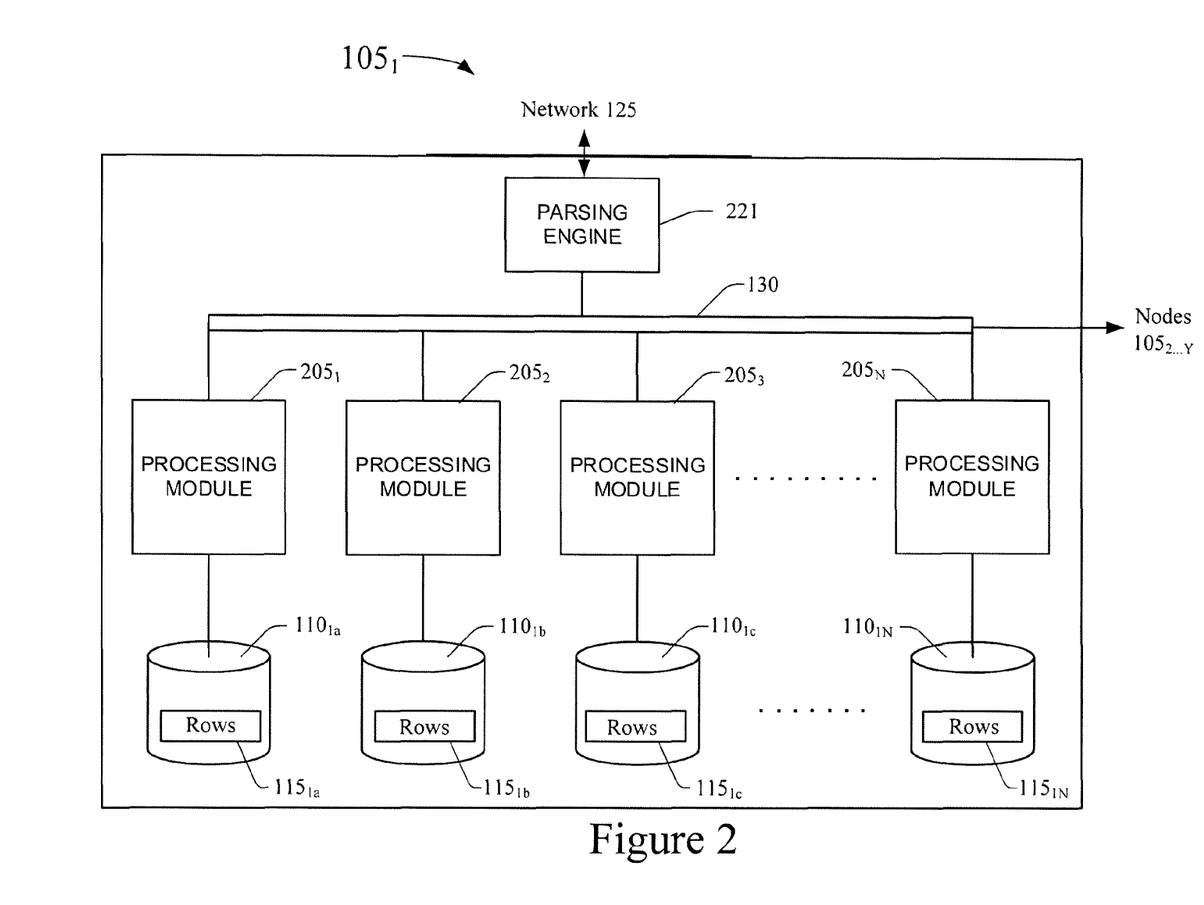
FIG. 2 depicts a diagrammatic representation of a sample architecture for one processing node of the system depicted in FIG. 1.

FIG. 2 depicts a diagrammatic representation of a sample architecture for one processing node $105_1$ of the DBS 100. The DBS node $105_1$ includes one or more processing modules $205_{1 \ldots N}$, such as one or more AMPs, connected by an interconnect 130 that manage the storage and retrieval of data in data-storage facilities $110_{1a \ldots 1N}$. Each of the processing modules $205_{1 \ldots N}$ may be one or more physical processors or each may be a virtual processor, with one or more virtual processors running on one or more physical processors.

For the case in which one or more virtual processors are running on a single physical processor, the single physical processor swaps between the set of N virtual processors. For the case in which N virtual processors are running on an M-processor node, the node's operating system schedules the N virtual processors to run on its set of M physical processors. If there are 4 virtual processors and 4 physical processors, then typically each virtual processor would run on its own physical processor. If there are 8 virtual processors and 4 physical processors, the operating system would schedule the 8 virtual processors against the 4 physical processors, in which case swapping of the virtual processors would occur.

Each of the processing modules $205_{1 \ldots N}$ manages a portion of a database that is stored in a corresponding one of the data-storage facilities $110_{1a \ldots 1N}$. Each of the data-storage facilities $110_{1a \ldots 1N}$ includes one or more disk drives. The DBS may include multiple nodes $105_{2 \ldots Y}$ in addition to the illustrated node $105_1$, connected by way of the interconnect 130.

A parsing engine 221 instance organizes the storage of data and the distribution of table rows $115_{1a \ldots 1N}$ among the processing modules $205_{1 \ldots N}$. The parsing engine 221 also coordinates the retrieval of data from the data-storage facilities $110_{1a \ldots 1N}$ in response to queries received from a user at a client computer system. The DBS 100 usually receives queries and commands to build tables in a standard format, such as SQL.

In one implementation, the rows $115_{1a \ldots 1N}$ are distributed across the data-storage facilities $110_{1a \ldots 1N}$ by the parsing engine 221 in accordance with their primary index. The primary index defines the columns of the rows that are used for calculating a hash value. The function that produces the hash value from the values in the columns specified by the primary index is called the hash function. Some portion, possibly the entirety, of the hash value is designated a "hash bucket." The hash buckets are assigned to data-storage facilities $110_{1a\ldots1N}$ and associated processing modules $205_{1\ldots N}$ by a hash bucket map. The characteristics of the columns chosen for the primary index determine how evenly the rows are distributed.

Figure 3:
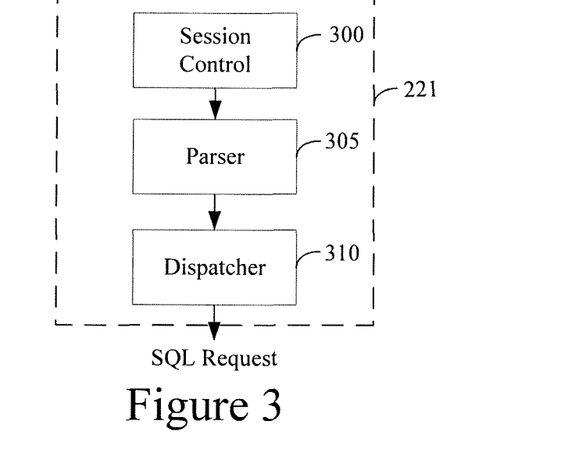
FIG. 3 is a diagrammatic representation of a parsing engine implemented in accordance with an embodiment.
Figure 4:
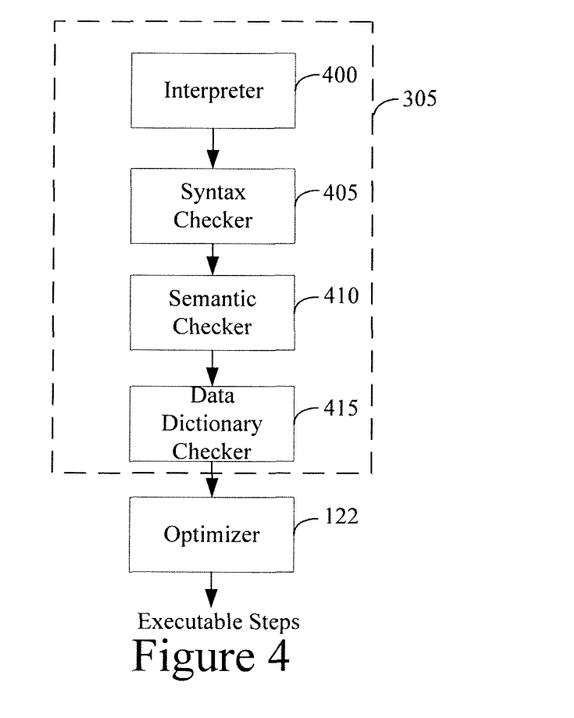
FIG. 4 is a diagrammatic representation of a parser implemented in accordance with an embodiment.

In one example system, a parsing engine, such as the parsing engine 221, is made up of three components: a session control 300, a parser 305, and a dispatcher 310 as shown in FIG. 3. The session control 300 provides the logon and logoff functions. It accepts a request for authorization to access the database, verifies it, and then either allows or disallows the access. Once the session control 300 allows a session to begin, a user may submit a SQL request that is routed to the parser 305. As illustrated in FIG. 4, the parser 305 interprets the SQL request (block 400), checks the request for correct SQL syntax (block 405), evaluates the request semantically (block 410), and consults a data dictionary to ensure that all of the objects specified in the SQL request exist and that the user has the authority to perform the request (block 415). Finally, the parser 305 runs the optimizer 122 that selects the least expensive plan to perform the request.

In a system in which rows of tables or relations may be distributed across multiple processing nodes, a join operation executed in parallel may be performed efficiently when the data is uniformly distributed across the system by a redistribution mechanism. However, if one processing module, e.g., an AMP, receives much more data than other AMPs, processing of a parallel join may demonstrate a relatively slow response time, excessive system resource usage, and such an operation may exhibit a low overall system parallel efficiency. An AMP may receive significantly more data due to various causes, such as a natural demographic data skew, e.g., high biased values, skew resulting from null values, or various other causes. Adding additional nodes or AMPs may decrease the overall parallel efficiency since adding more nodes may result in distribution of less rows to each non-hot AMP thereby producing a greater relative disproportionate distribution of rows to the hot AMP.

A table may be duplicated to each AMP involved in processing of the parallel join if the table is much smaller than the other table involved in the parallel join. Duplicating a table across AMPs involved in a parallel join is referred to herein as table duplication.

Most base tables, e.g., user-defined tables that are physically stored in system 100, have carefully designed primary indexes to evenly distribute rows across all AMPs of an MPP system. However, skew naturally and frequently occurs in certain types of join operations. Redistribution of tables on join columns often results in severely degraded performance if a join column has highly-skewed values. Duplication of the smaller table involved in a join operation is typically efficient when skew occurs in the join column of the larger table assuming the rows are evenly distributed across the AMPs. However, the duplication cost is not scalable—the larger the system, the more expensive table duplication is in terms of both I/O and CPU cost on all AMPs as well as the overall network bandwidth.

Figure 5:
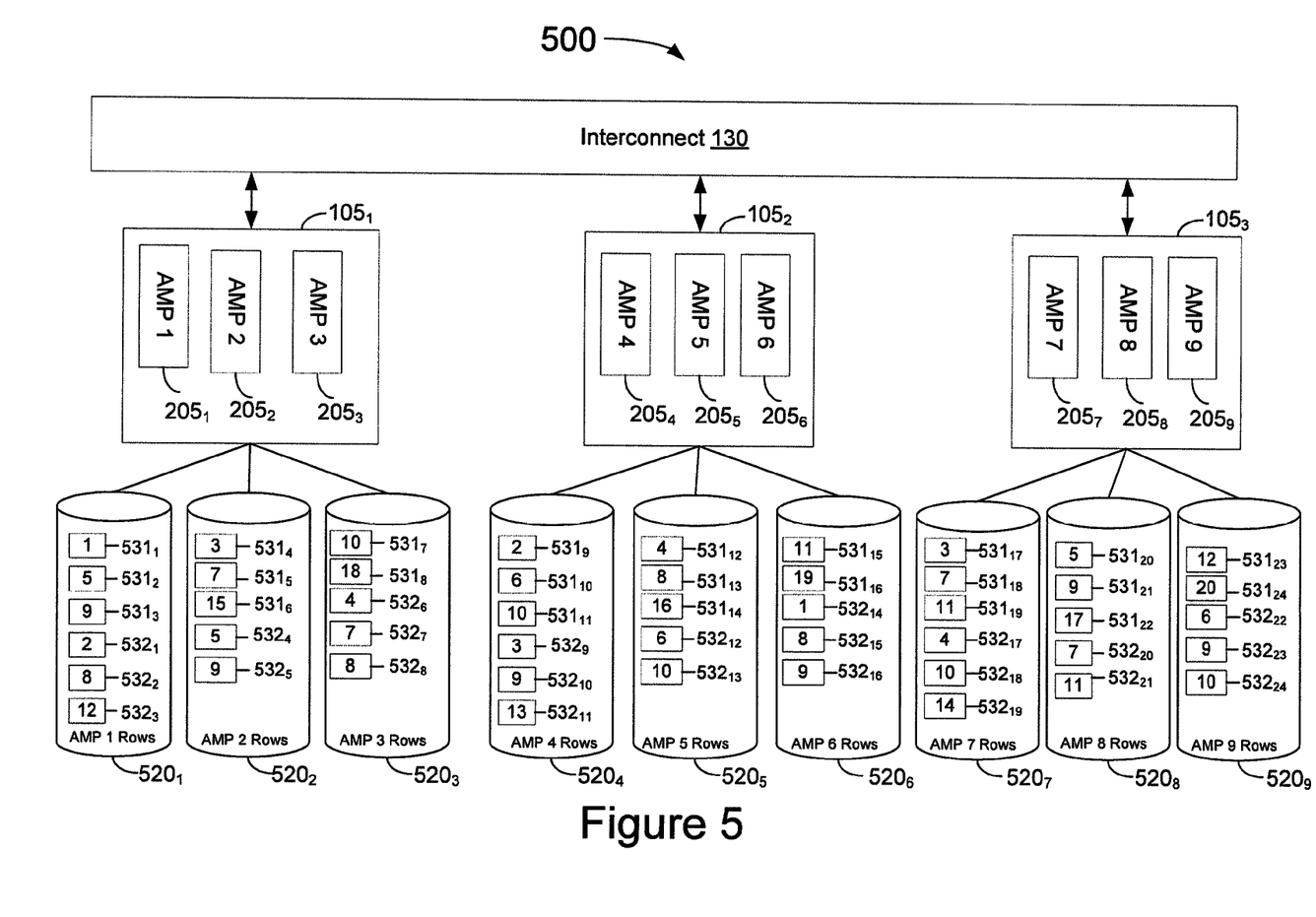
FIG. 5 is a diagrammatic representation of a massively parallel processing system configuration in which a table redistribution may be performed to facilitate execution of a parallel join.

FIG. 5 is a diagrammatic representation of an MPP configuration 500 in which a table redistribution may be performed to facilitate execution of a parallel join. In the illustrative example, assume the rows of two tables have been distributed across nine AMPs $205_1$-$205_9$ hosted by processing nodes $105_1$-$105_3$ such that each of the AMPs is allocated rows $520_1$-$520_9$. Consider a join operation to be executed that is specified by the following:

Select*from TableR, TableS where TableR.a=TableS.b

Figure 6:
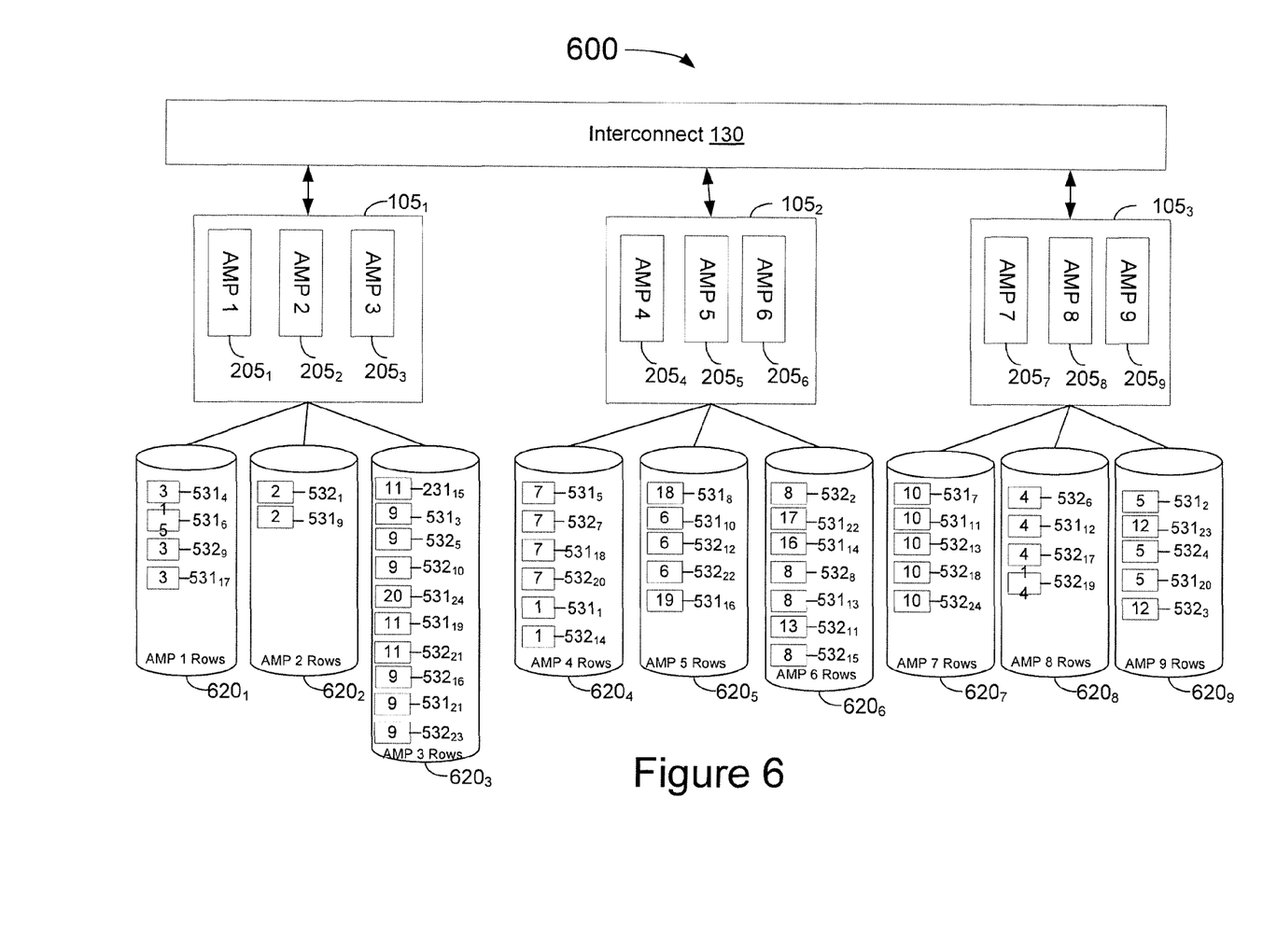
FIG. 6 depicts a diagrammatic representation of a redistribution of table rows that facilitates execution of a join operation.

In the present example, column a elements of TableR are designated $531_1$-$531_1$-$531_{24}$ and column b elements of TableS are designed $532_1$-$532_{24}$. Assume that the rows of TableR and TableS are distributed among AMPs $205_1$-$205_9$ via a hash of primary indexes of TableR and TableS. In this situation, the rows may be redistributed by hashing the values of the join attributes and redistributing the rows based on the hash values such that rows from TableR and TableS that match on values of join attributes TableR.a and TableS.b are redistributed to the same AMPs. For example, FIG. 6 depicts a diagrammatic representation 600 of a redistribution of the table rows $520_1$-$520_9$ that facilitates execution of the join operation. Each AMP $205_1$-$205_9$ hashes the values of the join attributes of the rows $520_1$-$520_9$ originally distributed thereto, and redistributes the rows according to the hash values. Accordingly, the AMPs $205_1$-$205_9$ respectively receive redistributed rows $620_1$-$620_9$. By hashing the values of the join attributes, join attributes having matching values are redistributed to a common AMP and the join statement may then be completed in parallel. For example, the element $531_1$ of the attribute TableR.a has a value of "1", and element $532_{14}$ of the attribute TableS.b has a value of "1". Because neither column a of TableR nor column b of TableS is the primary index by which the tables are originally distributed in the MPP system, elements $531_1$ and $532_{14}$ are originally distributed to AMP $205_1$ and $205_6$ as depicted in FIG. 5. By hashing the join attributes and redistributing the rows according to the hashed attribute values, both element $531_1$ and $532_{14}$ are redistributed to a common AMP, e.g., AMP $205_4$ as depicted in FIG. 6. After hash redistribution of the tables, the join operation may then be executed in parallel.

In accordance with an embodiment, dynamic partial redistribution and partial duplication (DPRPD) mechanisms are implemented to optimize parallel join operations on skewed data without prior knowledge that data skew is present. In the described embodiments, a conventional hash redistribution join plan may be implemented and, upon the dynamic detection of skewed data, a PRPD mechanism is invoked. Advantageously, both join relations are scanned only once whether data skew is detected or not.

Assume that two tables R and S are to be joined in parallel on join attributes R.a=S.b, and that the relation R is larger than the relation S. Further assume that dynamic skew detection is implemented for values of the join attribute R.a in accordance with an embodiment. Each AMP redistributes rows of R and S according to traditional redistribution mechanisms. In an embodiment, each AMP involved in the parallel join monitors the number of rows it has received via redistribution from other AMPs. If an AMP detects that it has become "hot" by receiving more rows than expected, then the hot AMP notifies all other AMPs involved in the parallel join to stop sending any additional rows having the detected skewed join attribute value to the hot AMP. To this end, the hot AMP preferably sends a list, L, of detected skewed value(s) of the join attribute R.a that it has detected. Responsive to receiving notification from the hot AMP, all AMPs maintain in a local spool, rather than redistributing, any rows of the relation R having a value of the join attribute R.a that has been identified by the hot AMP as skewed. Further, the AMPs duplicate, or broadcast, rows of the smaller relation S that have a value of the join attribute S.b that is identified as a skewed value in the skewed list, L, to all other AMPs. Rows of either table TableR and TableS that have values of the join attributes TableR.a and TableS.b that do not match a detected skewed value are hash redistributed on the join attribute. The hot processing module removes rows having a value of the join attribute, TableS.b, detected as skewed from a redistribution spool allocated thereto for storage of rows of the smaller table, TableS, received via redistribution from other processing modules. The rows removed by the hot processing module from the redistribution spool allocated thereto for storage of rows of the smaller table, TableS, received via redistribution from other processing modules are then duplicated to each of the processing modules involved in the parallel join operation. When all rows of the tables involved in the parallel join operation have been processed, e.g., (redistributed, duplicated or kept locally), the join operation is completed by performing a local join at each processing module and merging the results of the local join operations as described more fully hereinbelow.

Figure 7:
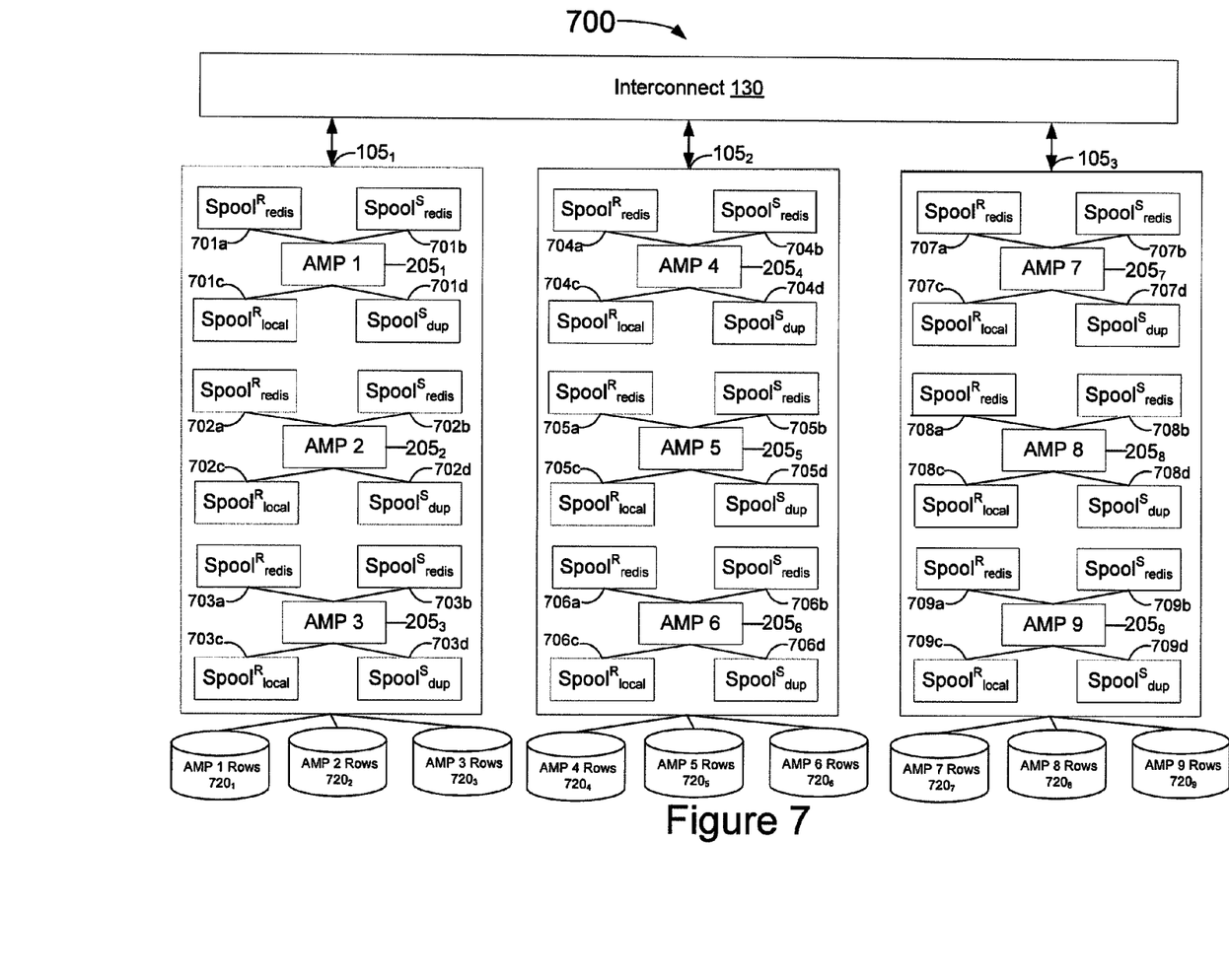
FIG. 7 is a diagrammatic representation of a massively parallel processing system configuration that facilitates dynamic detection and management of data skew for parallel join operations in accordance with an embodiment.

FIG. 7 is a diagrammatic representation of an MPP system configuration 700 that facilitates dynamic detection and management of data skew for parallel join operations in accordance with an embodiment. In the examples provided herein, a join operation is to be executed on a column (designated column a) of a first table (designated TableR) and a column (designated column b) of a second table (designated TableS). The rows of the tables have been distributed among a plurality of AMPs $205_1$-$205_9$ by, for example, a hash of respective primary indexes of the tables TableR and TableS. Thus, one or more of the AMPs $205_1$-$205_9$ have respective rows $720_1$-$720_9$ distributed thereto. It is further assumed the join attributes TableR.a and TableS.b are not the primary indexes on which the tables are originally distributed in the MPP system.

Each of the AMPs $205_1$-$205_9$ has a respective spool (Spool$^R_{redis}$ 701a-709a) allocated thereto in which the corresponding AMP $205_1$-$205_9$ stores rows of a first table (TableR) received by the AMP via redistribution from other AMPs. For example, the AMP $205_1$ has a spool Spool$_R^{redis}$ 701a in which the AMP $205_1$ stores rows of TableR received from any of the AMPs $205_1$-$205_9$ as a result of the hash redistribution of the TableR rows. In a similar manner, each of the AMPs $205_1$-$205_9$ has a respective spool (Spool$_S^{redis}$ 701b-709b) allocated thereto in which the corresponding AMP $205_1$-$205_9$ stores rows of a second table (TableS) received by the AMP via redistribution from other AMPs.

In the case of detection of a hot AMP due to skew of a value of a join attribute TableR.a, a spool Spool$^R_{local}$ 701c-709c and a spool Spool$^S_{dup}$ 701d-709d are respectively allocated for each of the AMPs $205_1$-$205_9$. The spools Spool$^R_{local}$ 701c-709c are allocated to store rows of TableR that would be redistributed by an AMP to the hot AMP if excessive receipt of redistributed rows by the hot AMP were not detected. The spools Spool$^S_{dup}$ 701d-709d are allocated for duplication of rows of the table TableS that have a join attribute TableS.b identified as skewed.

A dynamic skew detection routine implemented in accordance with an embodiment initially executes a redistribution of the table rows by a hash redistribution of the join attributes TableR.a and TableS.b. Thus, in the present example, each of the AMPs $205_1$-$205_9$ begins to redistribute the rows $720_1$-$720_9$ allocated thereto by hashing the values of join attributes TableR.a and TableS.b and redistributing the rows according to the hash values. For example, the AMP $205_1$ begins hashing the rows $720_1$ on the join attributes TableR.a and TableS.b and redistributes the rows $720_1$ among the AMPs $205_1$-$205_9$ according to the hash values. In a similar manner, each of the AMPs $205_2$-$205_9$ begins hashing the values of join attributes TableR.a and TableS.b of respective rows $720_2$-$720_9$ and redistributing the rows accordingly.

A dynamic skew detection routine may transition to a variation of a Partial Redistribution, Partial Duplication plan after data skew is dynamically detected in accordance with disclosed embodiments. To this end, while each AMP is hash redistributing the rows, an instance of a skew detection subroutine running on each of the AMPs $205_1$-$205_9$ monitors the number of rows that have been received by the respective AMP by redistribution from other AMPs. If an AMP is identified as a hot AMP by receiving more TableR rows than expected, the hot AMP may then provide a notification to all other AMPs to terminate redistribution of any additional rows that include the skewed value of the join attribute TableR.a to the hot AMP. For example, assume the skew detection routine running on AMP $205_3$ detects receipt of an excessive number of TableR redistributed rows having a value of the join attribute TableR.a of "9". The AMP $205_3$ then provides a notification to AMPs $205_1$-$205_2$ and $205_4$-$205_9$ of the detected hot status of the AMP $205_3$. The hot notification provided to AMPs $205_1$-$205_2$ and $205_4$-$205_9$ preferably includes a list, L, of the skewed value "9" of the join attribute TableR.a and provides a directive to the AMPs $205_1$-$205_2$ and $205_4$-$205_9$ to stop redistributing TableR rows having a value "9" of the join attribute TableR.a. On receipt of the hot notification, each of the AMPs opens two spool files (designated Spool$^R_{local}$ and Spool$^S_{dup}$.) In this instance, when another AMP $205_1$-$205_2$ and $205_4$-$205_9$ encounters a TableR row having a join attribute TableR.a value of "9", the AMP does not redistribute the row to the hot AMP. Instead, the AMP locally maintains the TableR row in the AMP's spool Spool$^R_{local}$. Any rows of the table TableS having a join attribute TableS.b value identified as skewed ("9" in the present example) are not redistributed by the AMP but, alternatively, are duplicated to each AMPs spool Spool$^S_{dup}$. Further, the hot AMP removes and duplicates any rows of the table TableS from the hot AMP's spool Spool$^S_{redis}$ having a value of the join attribute TableS.b that match the identified skewed value so that they may be joined locally with skewed rows of the table TableR that are maintained locally by other AMPs.

Figure 8:
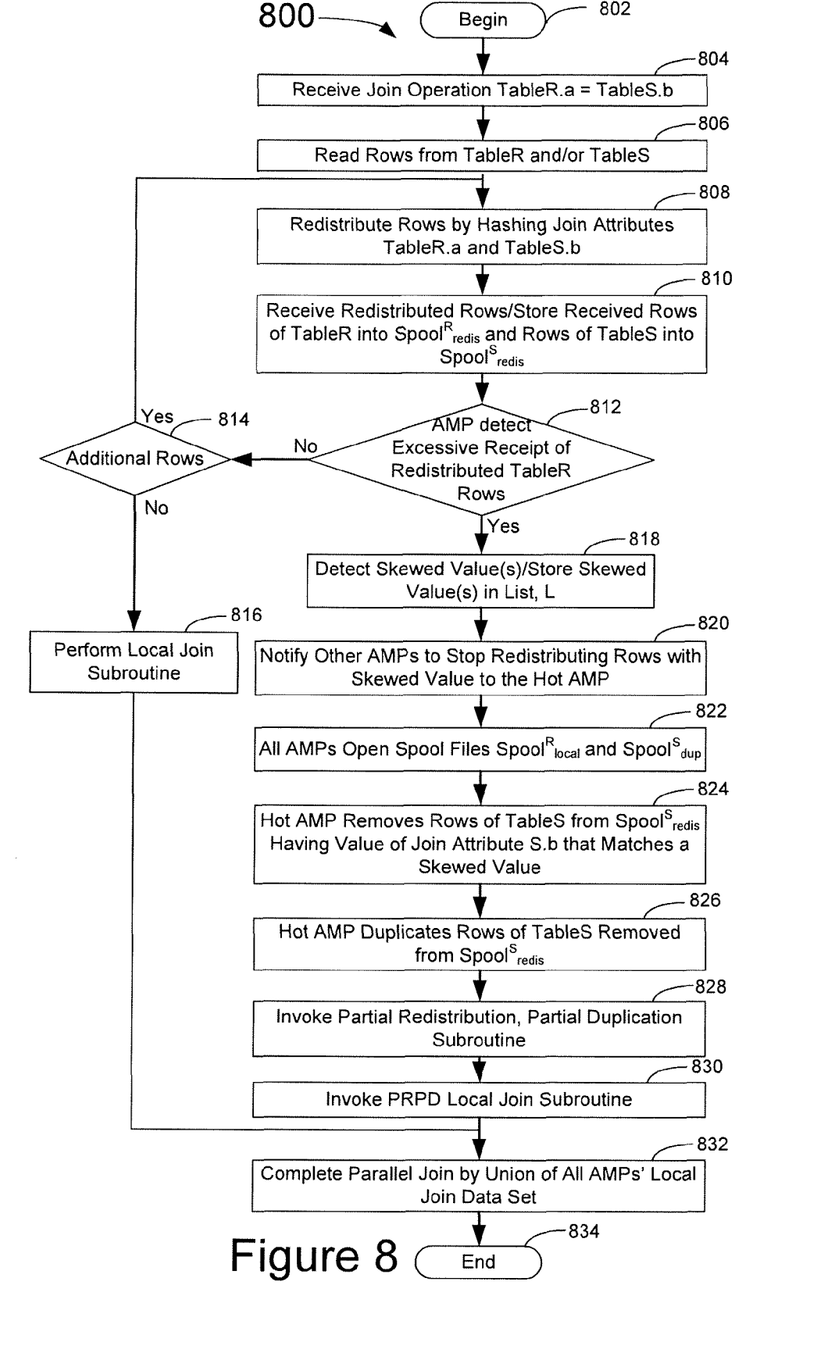
FIG. 8 is a flowchart that depicts processing of a parallel join subroutine that features dynamic skew detection and management implemented in accordance with an embodiment.

FIG. 8 is a flowchart 800 that depicts processing of a parallel join subroutine that features dynamic skew detection and management implemented in accordance with an embodiment. The processing steps of FIG. 8 may be implemented as computer-executable instructions tangibly embodied on a computer-readable medium executable by a processing system, such as one or more of the AMPs $205_1$-$205_9$ depicted in the MPP system of FIG. 7.

The parallel join subroutine is invoked (step 802), and a join operation is received (step 804). In the illustrative example, the join operation is on a first join attribute TableR.a of TableR and a second join attribute TableS.b of TableS. Consistent with the examples provided above, it is assumed that both tables TableR and TableS have been distributed among a plurality of AMPs $205_1$-$205_9$ by a hash distribution of table indexes and that neither of the join attributes TableR.a or TableS.b are included in the corresponding table indexes.

Each AMP $205_1$-$205_9$ that has any rows of the tables involved in the join operation allocated thereto then begins reading the AMP's corresponding rows $720_1$-$720_9$ (step 806). The AMPs $205_1$-$205_9$ then begin hashing the join attributes TableR.a and TableS.b and redistributing the rows accordingly (step 808). When an AMP receives a row redistributed from another AMP, the AMP stores the row redistributed thereto into the AMP's spool Spool$^R_{redis}$ if the row is a TableR row and stores the row in the AMP's spool Spool$^S_{redis}$ if the row is a TableS row (step 810).

Each AMP $205_1$-$205_9$ preferably has an instance of a skew detection subroutine that periodically evaluates whether the AMP has received an excessive number of redistributed TableR rows (step 812), i.e., performs an evaluation of whether the AMP has become "hot." For example, an AMP may evaluate whether the AMP has received more than d*s rows thereby indicating the AMP has become hot, where:

s=|R|/(Number of AMPs)

|R|=Number of rows in TableR; and d is a system configurable constant greater than 1.

The value of d determines how skewed the data may be to tolerate processing according to traditional hash redistribution mechanisms. For example, if d is set to "2", then some AMPs may receive twice as many redistributed rows of TableR relative to other AMPs prior to invoking the partial redistribution, partial duplication mechanisms of the disclosed embodiments. In this particular implementation, only the number of redistributed rows of TableR received by an AMP is considered to determine if the AMP is hot since the assumption is that TableR is much larger than TableS. In practice, when both tables are large and are approximately the same size, the number of rows an AMP has received from TableS may be considered when determining whether an AMP has become a hot AMP.

In the event that the AMP is not evaluated as hot, the AMP may evaluate whether additional rows remain for redistribution or receipt from other AMPs via redistribution (step 814). If so, the AMP may continue to redistribute remaining rows according to step 808 and/or receive redistributed rows according to step 810. If no additional rows remain for redistribution or receipt from redistribution and no AMPs have been evaluated as hot, the AMPs may then complete the local join (step 816), and the parallel join may then be completed by performing a union of each AMP's local join data set (step 832). The parallel join subroutine cycle may then (step 834).

Returning again to step 812, in the event that the AMP detects that it has become hot thereby indicating data skew, the hot AMP may generate a list, L, of the detected skewed value(s) of the join attribute TableR (step 818), and provide a notification to the other AMPs of the detected skewed value(s) and a directive to stop redistributing rows having the detected skewed value(s) of the join attribute TableR.a to the hot AMP (step 820). Upon transmission of the hot AMP notification and receipt of the notification by other AMPs, each AMP opens a respective spool $Spool^R_{local}$ and $Spool^S_{dup}$ (step 822). The spool $Spool^R_{local}$ is allocated to locally store (rather than redistribute) rows of the larger relation, TableR, identified by an AMP that have a join attribute TableR.a with a value identified as skewed. The spool $Spool^S_{dup}$ is allocated to store rows of the smaller relation, TableS, identified by any AMP as having a value of the join attribute, TableS.b, that is skewed and that is subsequently duplicated to each of the AMPs involved in the join operation. The hot AMP then removes any rows of TableS from the hot AMP's spool $Spool^S_{redis}$ that have a value of the join attribute TableS.b that matches a detected skewed value in the skewed list, L (step 824), and duplicates the rows of TableS having a value of the join attribute TableS.b that match the detected skewed value (step 826). A partial redistribution, partial duplication subroutine instance is then invoked on each of the AMPs (step 828) as described more fully hereinbelow with reference to FIGS. 9 and 10. Each AMP, upon completion of the PRPD subroutine, may then invoke a PRPD local join subroutine (step 830) as described more fully hereinbelow with reference to FIGS. 11 and 12. After each AMP's instance of the PRPD local join subroutine has completed processing, the parallel join is completed by merging or unioning each AMP's respective local join data set (step 832), and the parallel join subroutine cycle may then end according to step 834.

Figure 9:
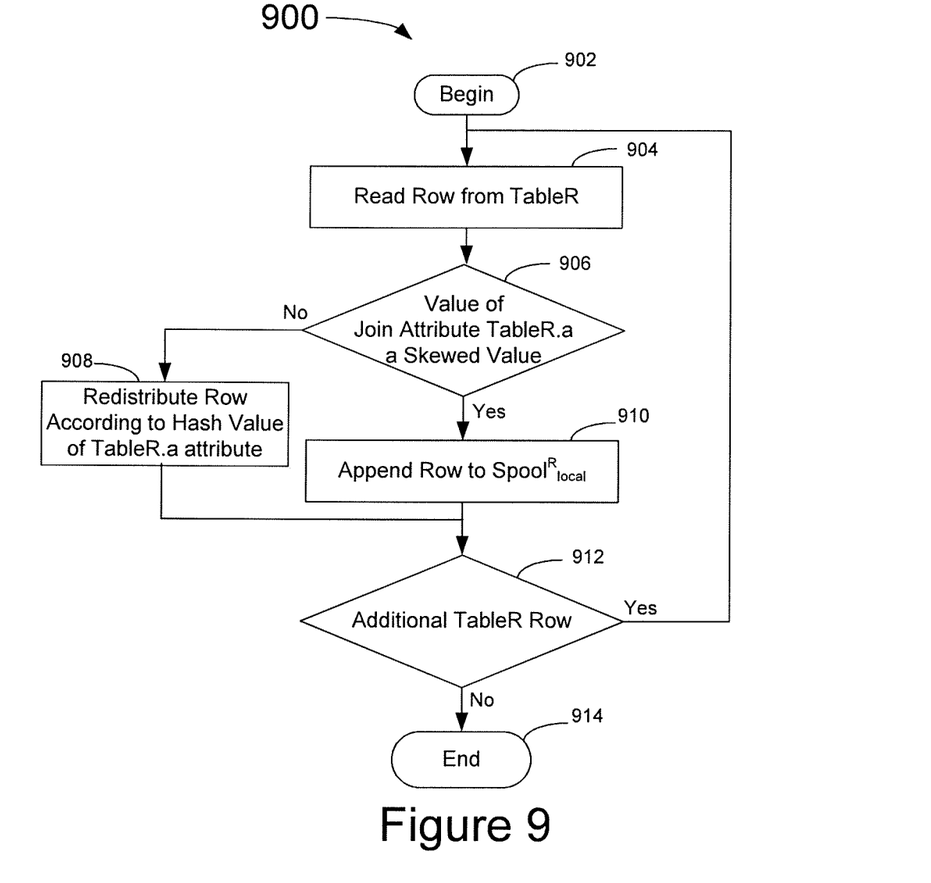
FIG. 9 is a flowchart that depicts processing of a partial redistribution, partial duplication subroutine that facilitates redistribution or local storage of rows of tables of a parallel join operation when skewed data has been dynamically detected in accordance with an embodiment.

FIG. 9 is a flowchart 900 that depicts processing of a partial redistribution, partial duplication subroutine that facilitates redistribution or local storage of rows of tables of a parallel join operation when skewed data has been dynamically detected in accordance with an embodiment. The processing steps of FIG. 9 may be implemented as computer-executable instructions tangibly embodied on a computer-readable medium executable by a processing system, such as one or more of the AMPs $205_1$-$205_9$ depicted in FIG. 7. The partial redistribution, partial duplication subroutine depicted and described with reference to FIG. 9 generally corresponds with step 828 of FIG. 8 for redistribution or local storage of rows of a larger table in which skewed data has been detected in the join attribute.

The PRPD subroutine is invoked (step 902), and each AMP $205_1$-$205_9$ continues reading rows $720_1$-$720_9$ from the table TableR for redistribution or local storage of the TableR rows (step 904). The AMP evaluates the join attributes to determine if the value of the join attribute TableR.a has been identified as skewed, that is whether the value of the join attribute TableR.a is included in the skewed values list, L (step 906). If the value of the join attribute TableR.a is not identified as a skewed value, the AMP redistributes the row to an AMP based on the hash value of the join attribute TableR.a (step 908), and the AMP that receives the redistributed row appends the row to the AMP's spool $Spool^R_{redis}$. The AMP's PRPD subroutine may then proceed to evaluate whether an additional TableR row remains for redistribution or local storage (step 912).

Returning again to step 906, if the value of the join attribute TableR.a is identified as a skewed value, the AMP does not redistribute the row to the hot AMP but instead appends the row to the AMP's spool $Spool^R_{local}$ (step 910) thereby locally storing the row. The AMP's PRPD subroutine may then proceed to evaluate whether an additional row of TableR remains for redistribution or local storage according to step 912. When no additional rows of TableR remain for redistribution or local storage, the partial redistribution, partial duplication subroutine cycle may then end (step 914).

Figure 10:
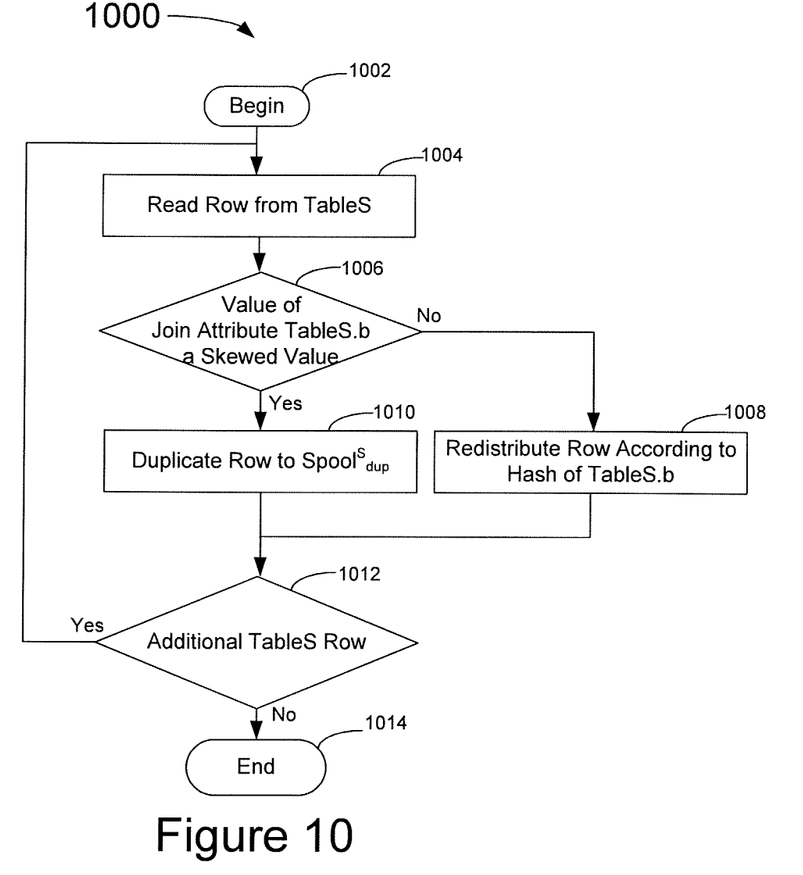
FIG. 10 is a flowchart that depicts processing of a partial redistribution, partial duplication subroutine that facilitates redistribution or duplication of table rows of a parallel join operation when skewed data has been dynamically detected in accordance with an embodiment.

FIG. 10 is a flowchart 1000 that depicts processing of a partial redistribution, partial duplication subroutine that facilitates redistribution or duplication of table rows in accordance with an embodiment. The processing steps of FIG. 10 may be implemented as computer-executable instructions tangibly embodied on a computer-readable medium executable by a processing system, such as one or more of the AMPs $205_1$-$205_9$ depicted in the MPP system of FIG. 7. The partial redistribution, partial duplication subroutine depicted and described with reference to FIG. 10 generally corresponds to step 828 of FIG. 8 for redistribution or duplication of rows of a smaller table TableS involved in a join operation for which data skew has dynamically been detected by an AMP.

The PRPD subroutine is invoked (step 1002), and a TableS row is read (step 1004). The value of the join attribute TableS.b is then evaluated to determine if it comprises a value that has been identified as skewed, i.e., whether the value of the join attribute TableS.b is included in the list, L, of skewed values (step 1006). If the join attribute, TableS.b, of the currently evaluated row does not comprise a skewed value, the AMP redistributes the row to an AMP based on the hash value of the join attribute TableS.b (step 1008), and the AMP that receives the redistributed row appends the row to the AMP's spool $Spool^S_{redis}$. The AMP's PRPD subroutine may then proceed to evaluate whether an additional TableS row remains for redistribution or duplication (step 1012).

Returning again to step 1006, if the value of the join attribute TableS.b of the currently evaluated row comprises a skewed value, the AMP does not redistribute the row to the hot AMP but, instead, duplicates the row to each AMP's spool $Spool^S_{dup}$ (step 1010). Duplication of the row may be performed, for example, by appending the row to a duplicate buffer, or other suitable memory space, allocated to the AMP. Upon completion of the table scan by the AMP, the rows that have been identified as having a skewed value of the join attribute TableS.b are duplicated to a respective spool $Spool^S_{dup}$ of each AMP where TableR resides. It should be understood that each AMP, including the AMP that sources rows to be duplicated, has the duplicated rows stored in the AMP's respective spool $Spool^S_{dup}$. The AMP's PRPD subroutine may then proceed to evaluate whether an additional TableS row remains for redistribution or duplication according to step 1012. When no additional TableS rows remain for redistribution or duplication, the partial redistribution, partial duplication subroutine cycle may then end (step 1014).

Notably, after detection of a hot AMP, each AMP including the hot AMP continues to redistribute rows of both tables involved in the join operation. Any row of TableR whose join attribute is identified as a skewed value that would be redistributed to the hot AMP if the hot AMP had not been identified as such is kept locally on each AMP including the hot AMP in the AMP's spool $Spool^R_{local}$, and any row of TableS whose join attribute is identified as a skewed value that would be redistributed to the hot AMP if the hot AMP had not been identified as hot is duplicated on each AMP's spool $Spool^S_{dup}$ including the hot AMP.

Figure 11:
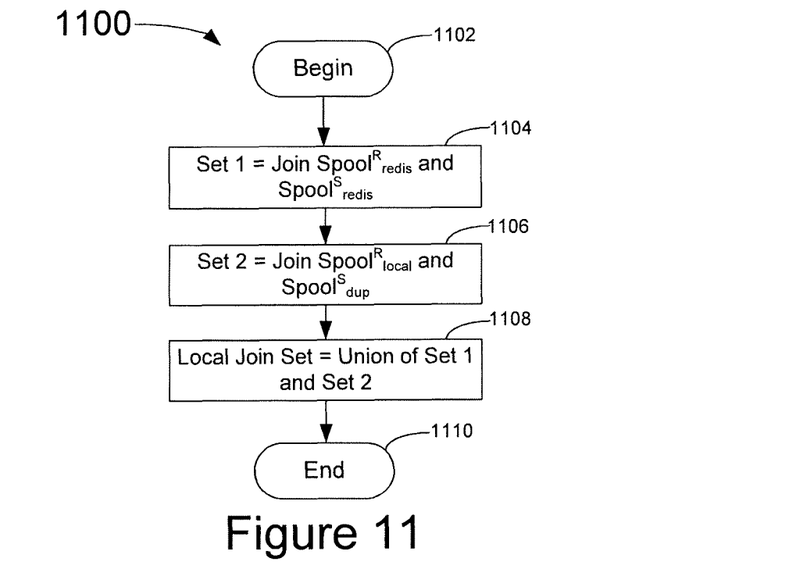
FIG. 11 is a flowchart that depicts processing of an instance of a partial redistribution, partial duplication local join subroutine that performs a local join for non-hot processing modules in accordance with an embodiment.

FIG. 11 is a flowchart 1100 that depicts processing of an instance of a PRPD local join subroutine that performs a local join for non-hot AMPs when any AMP has been identified as a hot AMP in accordance with an embodiment. The processing steps of FIG. 11 may be implemented as computer-executable instructions tangibly embodied on a computer-readable medium executable by a processing system, such as one or more of the AMPs $205_1$-$205_9$ of the MPP system depicted in FIG. 7. The local join subroutine described with reference to FIG. 11 is run by each non-hot AMP, and the processing steps of FIG. 11 generally correspond to step 830 of FIG. 8 for non-hot AMPs.

The PRPD local join subroutine is invoked (step 1102), and each of the non-hot AMPs generates a first data set (Set 1) by joining the AMP's respective $Spool_R^{redis}$ and $Spool^S_{redis}$ (step 1104). Each non-hot AMP generates a second data set (Set 2) by joining the AMP's respective spool $Spool^R_{local}$ and spool $Spool^S_{dup}$ (step 1106). Each non-hot AMP then generates a respective local join data set (Local Join Set) by unioning the Set 1 and Set 2 resulting from steps 1104 and 1106 (step 1108), and the PRPD local join subroutine cycle then ends (step 1110).

The first join data set, Set 1, semantically comprises a join of the rows of TableR and TableS that are redistributed to the non-hot AMP from all AMPs as in a traditional hash redistribution. Semantically, the second join data set, Set 2, comprises a join of the rows of TableR and TableS on the non-hot AMP that would have been redistributed to the hot AMP as in a traditional hash redistribution. Essentially, the second join data set offloads some burden from the hot AMP relative to a traditional hash redistribution mechanism.

Figure 12:
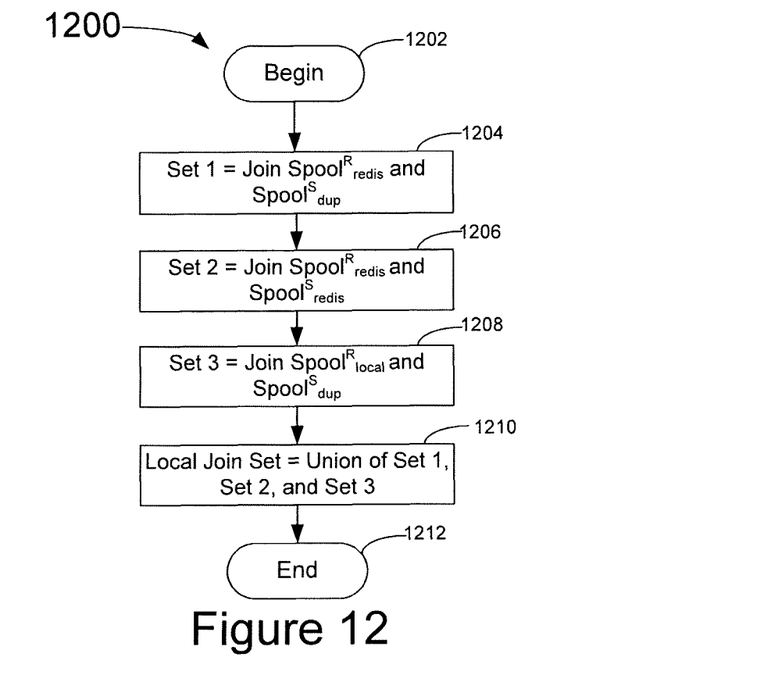
FIG. 12 is a flowchart that depicts processing of an instance of a partial redistribution, partial duplication local join subroutine that performs a local join for a processing module identified as hot in accordance with an embodiment.

FIG. 12 is a flowchart 1200 that depicts processing of an instance of a PRPD local join subroutine that performs a local join for an AMP identified as hot in accordance with an embodiment. The processing steps of FIG. 12 may be implemented as computer-executable instructions tangibly embodied on a computer-readable medium executable by a processing system, such as one or more of the AMPs $205_1$-$205_9$ of the MPP system depicted in FIG. 7. The PRPD local join subroutine described with reference to FIG. 12 is run by each hot AMP, and the processing steps of FIG. 12 generally correspond to step 830 of FIG. 8 for any AMPs that have been identified as hot.

The PRPD local join subroutine is invoked (step 1202), and each hot AMP generates a first data set (Set 1) by performing a join of the AMP's $Spool_R^{redis}$ and $Spool^S_{dup}$ (step 1204). Each hot AMP generates a second data set (Set 2) by joining the AMP's $Spool^R_{redis}$ and $Spool^S_{redis}$ (step 1206). The hot AMP then generates a third data set (Set 3) by joining the AMP's $Spool^R_{local}$ and $Spool^S_{dup}$ (step 1208). The hot AMP then produces a local join data set (Local Join Set) by merging or unioning the hot AMP's first, second, and third data sets (step 1210). The hot AMP's PRPD local join subroutine cycle may then end (step 1212). The final result of the join operation is then obtained by a union of all AMPs' local join data sets according to step 832 of FIG. 8.

Notably, the hot AMP performs one more join operation than other, non-hot, AMPs due to the first join (for producing the Set 1 of the hot AMP) being needed because prior to the hot AMP being detected as hot, some skewed rows of the table TableR may have already been redistributed and stored in the hot AMPs spool $Spool^R_{redis}$. Therefore, the spool $Spool^R_{redis}$ is needed to be joined with the spool $Spool^S_{dup}$ which contains matching rows from TableS for the skewed values of the join attribute TableR.a. Advantageously, there is no need to eliminate any duplicates in the unions because there are no duplicates in the join results.

Advantageously, each AMP only scans the rows of the tables allocated thereto once. If there is no data skew detected in the process of redistributing rows of the tables involved in the join operation, then the parallel join is carried out according to a traditional hash redistribution mechanism, and no extra significant processing cost is incurred.

As described, a method, computer-readable medium, and system that facilitate dynamic detection and management of data skew during a parallel join operation are provided. Rows allocated to processing modules involved in the join operation are initially redistributed among the processing modules by a hash redistribution on values of the join attributes. Receipt by a processing module of an excessive number of redistributed rows having a skewed value on the join attribute is detected thereby identifying the processing module as a hot processing module. The hot processing module then notifies the other processing modules involved in the parallel join operation of the skewed value of the join attribute, and further directs the other processing modules to terminate redistribution of rows having a join attribute value matching the skewed value. Each processing module, upon notification of the detected skewed value, invokes a partial redistribution, partial duplication subroutine. The processing modules involved in the parallel join operation then open a spool file for local storage of rows of the larger table that have a value of the join attribute that match the detected skewed value. The processing modules additionally open another spool file for duplication of rows of the smaller table that have a value of the join attribute that match the detected skewed value. The hot processing module removes rows having a value of the join attribute that match the detected skewed value from a redistribution spool allocated thereto for storage of rows of the smaller table received via redistribution from other processing modules. The rows removed by the hot processing module from the redistribution spool allocated thereto for storage of rows of the smaller table received via redistribution from other processing modules are then duplicated to each of the processing modules involved in the parallel join operation. When all rows of the tables involved in the parallel join operation have been redistributed or duplicated, the join operation is completed by performing a local join at each processing module and merging the results of the local join operations.

The flowcharts of FIGS. 8-12 depict process serialization to facilitate an understanding of disclosed embodiments and are not necessarily indicative of the serialization of the operations being performed. In various embodiments, the processing steps described in FIGS. 8-12 may be performed in varying order, and one or more depicted steps may be performed in parallel with other steps. Additionally, execution of some processing steps of FIGS. 8-12 may be excluded without departing from embodiments disclosed herein.

The illustrative block diagrams and flowcharts depict process steps or blocks that may represent modules, segments, or portions of code that include one or more executable instructions for implementing specific logical functions or steps in the process. Although the particular examples illustrate specific process steps or procedures, many alternative implementations are possible and may be made by simple design choice. Some process steps may be executed in different order from the specific description herein based on, for example, considerations of function, purpose, conformance to standard, legacy structure, user interface design, and the like.

Aspects of the disclosed embodiments may be implemented in software, hardware, firmware, or a combination thereof. The various elements of the system, either individually or in combination, may be implemented as a computer program product tangibly embodied in a machine-readable storage device for execution by a processing unit. Various steps of embodiments may be performed by a computer processor executing a program tangibly embodied on a computer-readable medium to perform functions by operating on input and generating output. The computer-readable medium may be, for example, a memory, a transportable medium such as a compact disk, a floppy disk, or a diskette, such that a computer program embodying aspects of the disclosed embodiments can be loaded onto a computer. The computer program is not limited to any particular embodiment, and may, for example, be implemented in an operating system, application program, foreground or background process, or any combination thereof, executing on a single processor or multiple processors. Additionally, various steps of embodiments may provide one or more data structures generated, produced, received, or otherwise implemented on a computer-readable medium, such as a memory.

Although disclosed embodiments have been illustrated in the accompanying drawings and described in the foregoing description, it will be understood that embodiments are not limited to the disclosed examples, but are capable of numerous rearrangements, modifications, and substitutions without departing from the disclosed embodiments as set forth and defined by the following claims. For example, the capabilities of the disclosed embodiments can be performed fully and/or partially by one or more of the blocks, modules, processors or memories. Also, these capabilities may be performed in the current manner or in a distributed manner and on, or via, any device able to provide and/or receive information. Still further, although depicted in a particular manner, a greater or lesser number of modules and connections can be utilized with the present disclosure in order to accomplish embodiments, to provide additional known features to present embodiments, and/or to make disclosed embodiments more efficient. Also, the information sent between various modules can be sent between the modules via at least one of a data network, an Internet Protocol network, a wireless source, and a wired source and via a plurality of protocols.

What is claimed is:

1. A method of performing a parallel join operation in a parallel processing system, comprising:
   distributing a respective set of rows of a first table and a second table involved in a join operation to each of a plurality of processing modules, wherein the join operation comprises a join on a first column of the first table and a second column of the second table;
   allocating a respective first spool and a respective second spool to each of the plurality of processing modules;
   hashing at least a portion of the respective set of rows of the first table on the first column and at least a portion of the respective set of rows of the second table on the second column by each of the plurality of processing modules;
   redistributing, by each of the plurality of processing modules, at least a portion of the rows of the respective distributed set of rows of the first table and the second table distributed thereto based on a hash value of one of the first column and the second column to one of the plurality of processing modules;
   thereafter, detecting, by a first processing module of the plurality of processing modules, a skewed value of the first column; and
   transmitting a notification, by the first processing module, to each of the plurality of processing modules of the skewed value of the first column after the detecting by the first processing module.

2. The method of claim 1, further comprising allocating a respective third spool and a respective fourth spool to each of the plurality of processing modules in response to receiving the notification of the skewed value.

3. The method of claim 2, further comprising: placing, by each of the plurality of processing modules, rows of the first table respectively received thereby via redistribution into the respective first spool allocated to the processing module; and placing, by each of the plurality of processing modules, rows of the second table respectively received thereby via redistribution into the respective second spool allocated to the processing module.

4. The method of claim 3, further comprising: responsive to detecting the skewed value, removing, by the first processing module, rows of the second spool allocated thereto having a value of the second column that matches the skewed value; and duplicating, by the first processing module, rows of the second spool removed by the first processing module with each of the plurality of processing modules, wherein each of the plurality of processing modules stores rows of the second spool received via duplication by the first processing module in the processing module's respective fourth spool.

5. The method of claim 4, further comprising: responsive to receiving the notification, evaluating, by each of the plurality of processing modules, a value of the first column of a row allocated to the respective processing module; determining, by at least one of the plurality of processing modules, the value of the first column of a row allocated thereto matches the detected skewed value; and appending the row having the value of the first column that matches the skewed value in the third spool allocated to the processing module.

6. The method of claim 5, further comprising: evaluating, by each of the plurality of processing modules, a value of the second column of a row allocated to the respective processing module; determining, by at least one of the plurality of processing modules, the value of the second column of a row allocated thereto matches the detected skewed value; and duplicating the row having the value of the second column that matches the skewed value to each of the plurality of processing modules, wherein each of the plurality of processing modules appends the row having the value of the second column that matches the skewed value in the respective fourth spool allocated to the processing module.

7. The method of claim 6, further comprising performing a local join operation by each of the plurality of processing modules excluding the first processing module by: calculating, by each of the plurality of processing modules excluding the first processing module, a first data set by joining the respective first spool with the respective second spool allocated thereto; calculating, by each of the plurality of processing modules excluding the first processing module, a second data set by joining the respective third spool with the respective fourth spool allocated thereto; and calculating, by each of the plurality of processing modules excluding the first processing module, a local join result by performing a union of the respective first data set and the respective second data set.

8. The method of claim 7, further comprising performing a local join operation by the first processing module by: calculating a first data set by joining the respective first spool of the first processing module with the respective fourth spool of the first processing module; calculating a second data set by joining the respective first spool of the first processing module with the respective second spool of the first processing module; calculating a third data set by joining the respective third spool of the first processing module with the respective fourth spool of the first processing module; and calculating a local join result of the first processing module by performing a union of the first data set of the first processing module, the second data set of the first processing module, and the third data set of the first processing module.

9. The method of claim 8, further comprising calculating a result of the join operation by unioning the respective local join result of each of the plurality of processing modules excluding the first processing module and the local join result of the first processing module.

10. A non-transient computer-readable medium including computer-executable instructions for execution by a processing system, the computer-executable instructions for performing a parallel join operation in a parallel processing system, the computer-executable instructions, when executed, cause the processing system to:
  distribute a respective set of rows of a first table and a second table involved in a join operation to each of a plurality of processing modules, wherein the join operation comprises a join on a first column of the first table and a second column of the second table;
  allocate a respective first spool and a respective second spool to each of the plurality of processing modules;
  hash at least a portion of the respective set of rows of the first table on the first column and at least a portion of the respective set of rows of the second table on the second column by each of the plurality of processing modules;
  redistribute, by each of the plurality of processing modules, at least a portion of the rows of the distributed respective set of rows of the first table and the second table distributed thereto based on a hash value of one of the first column and the second column to one of the plurality of processing modules;
  thereafter, detect, by a first processing module of the plurality of processing modules, a skewed value of the first column; and
  transmit a notification, by the first processing module, to each of the plurality of processing modules of the skewed value of the first column after the detecting by the first processing module.

11. The non-transient computer-readable medium of claim 10, further comprising instructions that, when executed, cause the processing system to allocate a respective third spool and a respective fourth spool to each of the plurality of processing modules in response to receiving the notification of the skewed value.

12. The non-transient computer-readable medium of claim 11, further comprising instructions that, when executed, cause the processing system to: place, by each of the plurality of processing modules, rows of the first table respectively received thereby via redistribution into the respective first spool allocated to the processing module; and place, by each of the plurality of processing modules, rows of the second table respectively received thereby via redistribution into the respective second spool allocated to the processing module.

13. The non-transient computer-readable medium of claim 12, further comprising instructions that, when executed, cause the processing system to: responsive to detecting the skewed value, remove, by the first processing module, rows of the second spool allocated thereto having a value of the second column that matches the skewed value; and duplicate, by the first processing module, rows of the second spool removed by the first processing module with each of the plurality of processing modules, wherein each of the plurality of processing modules stores rows of the second spool received via duplication by the first processing module in the processing module's respective fourth spool.

14. The non-transient computer-readable medium of claim 13, further comprising instructions that, when executed, cause the processing system to: responsive to receiving the notification, evaluate, by each of the plurality of processing modules, a value of the first column of a row allocated to the respective processing module; determine, by at least one of the plurality of processing modules, the value of the first column of a row allocated thereto matches the detected skewed value; and append the row having the value of the first column that matches the skewed value in the third spool allocated to the processing module.

15. The non-transient computer-readable medium of claim 14, further comprising instructions that, when executed, cause the processing system to: evaluate, by each of the plurality of processing modules, a value of the second column of a row allocated to the respective processing module; determine, by at least one of the plurality of processing modules, the value of the second column of a row allocated thereto matches the detected skewed value; and duplicate the row having the value of the second column that matches the skewed value to each of the plurality of processing modules, wherein each of the plurality of processing modules appends the row having the value of the second column that matches the skewed value in the respective fourth spool allocated to the processing module.

16. The non-transient computer-readable medium of claim 15, further comprising performing a local join operation by each of the plurality of processing modules excluding the first processing module, the computer-readable medium further including instructions that, when executed, cause the processing system to: calculate, by each of the plurality of processing modules excluding the first processing module, a first data set by joining the respective first spool with the respective second spool allocated thereto; calculate, by each of the plurality of processing modules excluding the first processing module, a second data set by joining the respective third spool with the respective fourth spool allocated thereto; and calculate, by each of the plurality of processing modules excluding the first processing module, a local join result by performing a union of the respective first data set and the respective second data set.

17. The non-transient computer-readable medium of claim 16, further comprising performing a local join operation by the first processing module, the computer-readable medium further including instructions that, when executed, cause the processing system to: calculate a first data set by joining the respective first spool of the first processing module with the respective fourth spool of the first processing module; calculate a second data set by joining the respective first spool of the first processing module with the respective second spool of the first processing module; calculate a third data set by joining the respective third spool of the first processing module with the respective fourth spool of the first processing module; and calculate a local join result of the first processing module by performing a union of the first data set of the first processing module, the second data set of the first processing module, and the third data set of the first processing module.

18. The non-transient computer-readable medium of claim 17, further comprising instructions that, when executed, cause the processing system to calculate a result of the join operation by unioning the respective local join result of each of the plurality of processing modules excluding the first processing module and the local join result of the first processing module.

19. A database management system, comprising: a plurality of processing modules; at least one storage device to which respective sets of rows of a first table and a second table involved in a join operation are allocated to each of the plurality of processing modules, wherein the join operation comprises a join on a first column of the first table and a second column of the second table; and at least one memory device that stores a respective first spool and a respective second spool allocated to each of the plurality of processing modules, wherein each of the plurality of processing modules hashes at least a portion of the respective set of rows of the first table on the first column and at least a portion of the respective set of rows of the second table on the second column, redistributes at least a portion of the rows of the distributed respective set of rows of the first table and the second table distributed thereto based on a hash value of one of the first column and the second column to one of the plurality of processing modules, and wherein after the redistributing a first processing module of the plurality of processing modules detects a skewed value of the first column and transmits a notification to each of the plurality of processing modules of the skewed value of the first column after the detecting by the first processing module.

20. The system of claim 19, wherein the first processing module duplicates to each of the plurality of processing modules rows of the second table that have a value of the second column that match the detected skewed value.

21. The system of claim 20, wherein each of the plurality of processing modules allocates a respective third spool and a respective fourth spool in response to receiving the notification of the skewed value, places rows of the first table respectively received thereby via redistribution into the respective first spool allocated to the processing module, and places rows of the second table respectively received thereby via redistribution into the respective second spool allocated to the processing module.

22. The system of claim 21, wherein the first processing module, responsive to detecting the skewed value, removes rows of the second spool allocated thereto having a value of the second column that matches the skewed value, and duplicates rows of the second spool removed by the first processing module with each of the plurality of processing modules, wherein each of the plurality of processing modules stores rows of the second spool received via duplication by the first processing module in the processing module's respective fourth spool.

23. The system of claim 22, wherein each of the plurality of processing modules receives the notification, evaluates a value of the first column of a row allocated to the respective processing module, determines the value of the first column of a row allocated thereto matches the detected skewed value, and appends the row having the value of the first column that matches the skewed value in the third spool allocated to the processing module.

24. The system of claim 23, wherein each of the plurality of processing modules evaluates a value of the second column of a row allocated to the respective processing module, wherein at least one of the plurality of processing modules determines the value of the second column of a row allocated thereto matches the detected skewed value and duplicates the row having the value of the second column that matches the skewed value to each of the plurality of processing modules, and wherein each of the plurality of processing modules appends the row having the value of the second column that matches the skewed value in the respective fourth spool allocated to the processing module.

25. The system of claim 24, wherein each of the plurality of processing modules excluding the first processing module performs a local join operation by calculating a first data set by joining the respective first spool with the respective second spool allocated thereto, calculates a second data set by joining the respective third spool with the respective fourth spool allocated thereto, and calculates a local join result by performing a union of the respective first data set and the respective second data set.

26. The system of claim 25, wherein the first processing module performs a local join operation by calculating a first data set by joining the respective first spool of the first processing module with the respective fourth spool of the first processing module, calculates a second data set by joining the respective first spool of the first processing module with the respective second spool of the first processing module, calculates a third data set by joining the respective third spool of the first processing module with the respective fourth spool of the first processing module, and calculates a local join result of the first processing module by performing a union of the first data set of the first processing module, the second data set of the first processing module, and the third data set of the first processing module.

* * * * *